United States Patent [19]
Koshirai et al.

[11] Patent Number: 6,025,441
[45] Date of Patent: Feb. 15, 2000

[54] POLYTETRAFLUOROETHYLENE-CONTAINING POWDER MIXTURE, THERMOPLASTIC RESIN COMPOSITIONS INCLUDING SAME AND MOLDED ARTICLES MADE THEREFROM

[75] Inventors: Atsunori Koshirai; Nobuhisa Takayama; Akira Yanagase, all of Otake, Japan

[73] Assignee: Mitsubishi Rayon Company Ltd., Tokyo, Japan

[21] Appl. No.: 08/903,371

[22] Filed: Jul. 30, 1997

[30] Foreign Application Priority Data

Jul. 31, 1996 [JP] Japan .................................. 8-202101
May 13, 1997 [JP] Japan .................................. 9-122352

[51] Int. Cl.$^7$ .................................................. C08L 27/12
[52] U.S. Cl. .......................... 525/199; 521/145; 521/149
[58] Field of Search ............................ 525/199; 521/145, 521/149

[56] References Cited

U.S. PATENT DOCUMENTS

| | | |
|---|---|---|
| Re. 31,907 | 6/1985 | Poirier . |
| 3,257,334 | 6/1966 | Chen et al. . |
| 3,334,157 | 8/1967 | Larsen . |
| 3,864,124 | 2/1975 | Breton et al. . |
| 3,994,814 | 11/1976 | Cairns . |
| 4,096,207 | 6/1978 | Saxon et al. . |
| 4,107,232 | 8/1978 | Haaf et al. . |
| 4,129,617 | 12/1978 | Machi et al. . |
| 4,167,232 | 9/1979 | Munk et al. . |
| 4,194,040 | 3/1980 | Breton et al. . |
| 4,344,878 | 8/1982 | Dolce . |
| 4,506,035 | 3/1985 | Barnett et al. . |
| 4,647,602 | 3/1987 | Wilczak et al. . |
| 4,649,168 | 3/1987 | Kress et al. . |
| 4,746,573 | 5/1988 | Arcella et al. . |
| 4,753,994 | 6/1988 | Carter, Jr. et al. . |
| 4,767,821 | 8/1988 | Lindner et al. . |
| 4,879,362 | 11/1989 | Morgan . |
| 4,904,726 | 2/1990 | Morgan et al. . |
| 4,904,735 | 2/1990 | Chapman, Jr. et al. . |
| 4,952,630 | 8/1990 | Morgan et al. . |
| 4,952,636 | 8/1990 | Morgan et al. ........................ 525/276 |
| 4,990,544 | 2/1991 | Asaumi et al. . |
| 5,013,792 | 5/1991 | Chapman, Jr. et al. . |
| 5,030,667 | 7/1991 | Shimizu et al. . |
| 5,057,575 | 10/1991 | Chapman, Jr. et al. . |
| 5,087,675 | 2/1992 | Takeo et al. . |
| 5,114,820 | 5/1992 | Georges et al. . |
| 5,120,600 | 6/1992 | Suppiah . |
| 5,157,076 | 10/1992 | Greenlee et al. . |
| 5,164,426 | 11/1992 | Shimizu et al. . |
| 5,188,764 | 2/1993 | Shimizu et al. . |
| 5,188,769 | 2/1993 | Connor et al. . |
| 5,192,473 | 3/1993 | Hruska et al. . |
| 5,294,669 | 3/1994 | Kawashima et al. . |
| 5,296,165 | 3/1994 | Shimizu et al. . |
| 5,464,494 | 11/1995 | Bolte et al. . |
| 5,494,752 | 2/1996 | Shimizu et al. . |
| 5,521,230 | 5/1996 | Bhatia et al. . |
| 5,552,210 | 9/1996 | Horn, III et al. . |
| 5,679,741 | 10/1997 | Breton et al. . |

FOREIGN PATENT DOCUMENTS

| | | |
|---|---|---|
| 752470 | 2/1967 | Canada . |
| 0 023 047 | 1/1981 | European Pat. Off. . |
| 0 166 187 | 1/1986 | European Pat. Off. . |
| 0 322 877 | 7/1989 | European Pat. Off. . |
| 0 373 588 | 6/1990 | European Pat. Off. . |
| 0 393 480 | 10/1990 | European Pat. Off. . |
| 0 598 603 | 5/1994 | European Pat. Off. . |
| 0 739 914 | 10/1996 | European Pat. Off. . |
| 0 822 226 | 2/1998 | European Pat. Off. . |
| 1249009 | 11/1960 | France . |
| 5-112695 | 5/1993 | Japan . |
| 5-117472 | 5/1993 | Japan . |
| 5-214183 | 8/1993 | Japan . |
| 6-306212 | 11/1994 | Japan . |
| 7-324147 | 12/1995 | Japan . |
| 486628 | 6/1938 | United Kingdom . |
| 696321 | 8/1953 | United Kingdom . |
| 1 236 948 | 6/1971 | United Kingdom . |

*Primary Examiner*—John M. Cooney, Jr.
*Attorney, Agent, or Firm*—Oblon, Spivak, McClelland, Maier & Neustadt, P.C.

[57] ABSTRACT

A polytetrafluoroethylene-containing powder mixture comprising polytetrafluoroethylene particles (A) with a particle size 10 $\mu$m or smaller and organic polymer particles (B), thermoplastic resin compositions containing it, and molded articles obtained therefrom. The polytetrafluoroethylene-containing powder mixture provides higher dispersibility for polytetrafluoroethylene in thermoplastic resins, and is effective for improving the molding workability and mechanical properties of thermoplastic resins.

14 Claims, No Drawings

POLYTETRAFLUOROETHYLENE-CONTAINING POWDER MIXTURE, THERMOPLASTIC RESIN COMPOSITIONS INCLUDING SAME AND MOLDED ARTICLES MADE THEREFROM

BACKGROUND OF THE INVENTION

1. Field of the Invention

The present invention relates to a polytetrafluoroethylene-containing powder mixture containing polytetrafluoroethylene particles with a particle size 10 $\mu$m or smaller (A) and organic polymer particles (B), to a thermoplastic resin composition including the mixture and to molded articles made therefrom.

2. Description of the Related Art

Polytetrafluoroethylene (PTFE) has excellent heat resistance, chemical resistance and electrical insulating properties and is widely used as a coating material because of its special surface characteristics including water and oil repellent, non-adhesive and self-lubricating properties. Also, its high crystallinity and low intramolecular force give it a nature suitable to forming fibers with only minimal stress, and when combined with thermoplastic resins it is possible to achieve better molding workability and mechanical properties, allowing it to be used as an additive for thermoplastic resins.

Japanese Unexamined Patent Publications No. 5-214184 and No. 6-306212, for example, disclose resin compositions wherein polytetrafluoroethylene is combined with polyolefins. Also, Japanese Unexamined Patent Publication No. 7-324147 discloses a process for producing polyolefin-based resin compositions whereby polytetrafluoroethylene prepared by mixing polytetrafluoroethylene with a powdered dispersion medium under high shear action is first made into fibers and then mixed with a polyolefin.

A drawback exists, however, in that polytetrafluoroethylene has poor dispersibility in common thermoplastic resins which contain no halogen atoms, and fails to uniformly disperse with only simple blends as described in Japanese Unexamined Patent Publications No. 5-214184 and No. 6-306212, thus notably impairing the surface appearance of resulting molds.

Furthermore, it is difficult to convert all of the polytetrafluoroethylene to fibers with shearing force by the process described in Japanese Unexamined Patent Publication No. 7-324147, and even the polytetrafluoroethylene fibers aggregate in the matrix resin making it impossible to obtain a uniform composition.

In other words, the dispersibility of polytetrafluoroethylene in matrix resins constitutes a problem in all of these processes, and therefore large amounts of the polytetrafluoroethylene have been necessary in order to exhibit the aforementioned useful properties.

SUMMARY OF THE INVENTION

It is an object of the present invention to provide a polytetrafluoroethylene-containing powder mixture which is effective for increasing the dispersibility of polytetrafluoroethylene in thermoplastic resins and improving the molding workability and mechanical characteristics of the thermoplastic resins.

As a result of diligent research aimed at solving the problems described above, the present invention has been completed upon the finding that satisfactory molding workability and mechanical characteristics and molded articles with excellent outer appearances can be obtained by adding to thermoplastic resins a polytetrafluoroethylene-containing powder mixture comprising polytetrafluoroethylene particles with a particle size of 10 $\mu$m or smaller and organic polymer particles.

The present invention thus provides a polytetrafluoroethylene-containing powder mixture comprising polytetrafluoroethylene particles (A) with a particle size of 10 $\mu$m or smaller and organic polymer particles (B), thermoplastic resin compositions including it, and molded articles obtained therefrom.

DESCRIPTION OF THE PREFERRED EMBODIMENTS

The polytetrafluoroethylene particles (A) used according to the invention must not form aggregates of particles of size exceeding 10 $\mu$m, and particles of size 0.05–1.0 $\mu$m are preferred. Such polytetrafluoroethylene particles are dispersed in water containing an emulsifier and the like, and an aqueous dispersion of the polytetrafluoroethylene particles can be obtained by polymerizing tetrafluoroethylene monomer by emulsion polymerization using a fluorine-containing surfactant.

In emulsion polymerization for producing the polytetrafluoroethylene particles, there may be used one or more copolymerizable components which may be a fluorine-containing olefin such as hexafluoropropylene, chlorotrifluoroethylene, fluoroalkylethylene, perfluoroalkylvinyl ether or a fluorine-containing alkyl (meth)acrylate such as perfluoroalkyl (meth)acrylate, so long as it does not impair the properties of the polytetrafluoroethylene. The content of the copolymerizable components is preferably no more than 10 wt % based on the tetrafluoroethylene.

As commercially available polytetrafluoroethylene particle dispersions there may be mentioned Fluon AD-1 and AD-936 by Asahi ICI Fluoropolymers, Polyflon D-1 and D-2 by Daikin Industries and Teflon 30J by Mitsui-DuPont Fluorochemicals.

The organic polymer particles (B) used according to the invention are not critical, but they preferably have affinity for thermoplastic resins from the standpoint of dispersibility of the polytetrafluoroethylene when combined with the thermoplastic resin.

As examples of monomers for producing the organic polymer particles there may be mentioned styrene monomers such as styrene, p-methylstyrene, o-methylstyrene, p-chlorostyrene, o-chlorostyrene, p-methoxystyrene, o-methoxystyrene, 2,4-dimethylstyrene and α-methylstyrene, (meth)acrylic acid esters such as methyl acrylate, methyl methacrylate, ethyl acrylate, ethyl methacrylate, butyl acrylate, butyl methacrylate, 2-ethylhexyl acrylate, 2-ethylhexyl methacrylate, dodecyl acrylate, dodecyl methacrylate, tridecyl acrylate, tridecyl methacrylate, octadecyl acrylate, octadecyl methacrylate, cyclohexyl acrylate and cyclohexyl methacrylate, vinyl cyanide monomers such as acrylonitrile and methacrylonitrile, vinyl ether monomers such as vinyl methyl ether and vinyl ethyl ether, vinyl carboxylate monomers such as vinyl acetate and vinyl butyrate, olefinic monomers such as ethylene, propylene and isobutylene, and diene monomers such as butadiene, isoprene and dimethylbutadiene. These monomers may be used alone or in combinations of 2 or more.

When the thermoplastic resin combined with the polytetrafluoroethylene-containing powder mixture of the invention is a polyolefin, styrene monomers, (meth)acrylic acid ester monomers and olefinic monomers are preferred among those mentioned above from the standpoint of compatibility. Particularly preferred are monomers containing at least 20 wt % of a long-chain alkyl (meth)acrylic acid ester monomer with 12 or more carbon atoms. Those containing at least 50 wt % are especially preferred.

When the thermoplastic resin combined with the polytetrafluoroethylene-containing powder mixture of the invention is polymethyl methacrylate, monomers containing at least 20 wt % of a (meth)acrylic acid ester monomer among the aforementioned monomers are preferred from the standpoint of compatibility.

When the thermoplastic resin combined with the polytetrafluoroethylene-containing powder mixture of the invention is a polyester, styrene monomers and (meth) acrylic acid ester monomers are preferred among those mentioned above from the standpoint of compatibility. Particularly preferred are monomers containing at least 1 wt % of a (meth)acrylic acid ester monomer with one or more epoxy groups.

The method of producing the aqueous dispersion of the organic polymer particles used for the invention is not critical, and for example, emulsion polymerization using an ionic emulsifying agent or soap-free emulsion polymerization using an ionic polymerization initiator may be employed.

The ionic emulsifying agent may be any anionic, cationic or ampholytic emulsifying agent. If desired a nonionic emulsifying agent may also be used in combination with the ionic emulsifying agent.

As examples of anionic emulsifying agents there may be mentioned fatty acid salts, higher alcohol sulfuric acid ester salts, liquid fatty oil sulfuric acid ester salts, fatty amine and fatty amide sulfuric acid salts, fatty alcohol phosphoric acid ester salts, sulfonic acid salts of dibasic fatty acid esters, fatty acid amide sulfonic acid salts, alkylallyl sulfonic acid salts and naphthalenesulfonic acid salts of formalin condensates.

As examples of cationic emulsifying agents there may be mentioned fatty amine salts, quaternary ammonium salts and alkylpyridinium salts.

As examples of ampholytic emulsifying agents there may be mentioned alkylbetaines.

As examples of ionic polymerization initiators there may be mentioned persulfates (for example, potassium persulfate and ammonium persulfate), azobis (isobutyronitrilesulfonate), 4,4'-azobis(4-cyanovaleric acid), and other anionic polymerization initiators, and 2,2'-azobis (amidinopropane) dihydrochloride, 2,2'-azobis[2-(5-methyl-2-imidazolin- 2-yl)propane] dihydrochloride, 2,2'-azobis[2-(2-imidazolin-2-yl)propane] dihydrochloride, 2,2'-azobisisobutylamide dihydrate and other cationic polymerization initiators.

The particle size [d] of the organic polymer particles (B) used for the invention is not critical, but from the standpoint of stability in an aggregated state with the polytetrafluoroethylene it is preferably in the range of the following inequality with respect to particle size D of the polytetrafluoroethylene particles.

0.1 D<d<10 D

The polytetrafluoroethylene-containing powder mixture of the invention is obtained by mixing the polytetrafluoroethylene particle dispersion and organic polymer particle dispersion and then solidifying or spray drying to make a powder, and it contains aggregated particles which have aggregated and simple particles which remain without aggregating, due to the difference in surface charges of the polytetrafluoroethylene particles and organic polymer particles. The aggregated particles have structures wherein the polytetrafluoroethylene particles and organic polymer particles are integrated, and their morphology can differ depending on the mixing ratio and particle sizes of both particle types. There exist, for example, a configuration in which the organic polymer particles surrounds the polytetrafluoroethylene particles, a configuration in which the polytetrafluoroethylene particles surrounds the organic polymer particles, and a configuration in which a plurality of particles are aggregated around a single particle. Aggregation of only the polytetrafluoroethylene particles which produces aggregates of 10 $\mu$m or greater is not preferred from the standpoint of dispersibility in the thermoplastic resin.

For a lower aggregation speed during mixing, a nonionic emulsifying agent may be adsorbed onto the surface of the polytetrafluoroethylene particles and/or (co)polymer particles of (meth)acrylic acid ester units with alkyl groups of at least 4 carbon atoms, prior to mixing.

There is no specific criticality on the nonionic emulsifying agent, and as examples there may be mentioned polyoxyethylene alkyl ether, polyoxyethylene alkylallyl ether, dialkylphenoxypoly(ethyleneoxy) ethanol, polyvinyl alcohol, polyacrylic acid and alkylcellulose.

The polytetrafluoroethylene-containing powder mixture of the invention may also be obtained by emulsion polymerization of a monomer with ethylenically unsaturated bonds in a dispersion prepared by mixing the polytetrafluoroethylene particle dispersion and organic polymer particle dispersion, followed by solidifying or spray drying to make a powder.

The ethylenically unsaturated monomer used for emulsion polymerization in the mixed dispersion will depend on the use of the polytetrafluoroethylene-containing powder mixture, and may be selected from styrene monomers such as styrene, p-methylstyrene, o-methylstyrene, p-chlorostyrene, o-chlorostyrene, p-methoxystyrene, o-methoxystyrene, 2,4-dimethylstyrene and $\alpha$-methylstyrene; acrylic acid esters such as methyl acrylate, methyl methacrylate, ethyl acrylate, ethyl methacrylate, butyl acrylate, butyl methacrylate, 2-ethylhexyl acrylate, 2-ethylhexyl methacrylate, dodecyl acrylate, dodecyl methacrylate, cyclohexyl acrylate and cyclohexyl methacrylate; vinyl cyanide monomers such as acrylonitrile and methacrylonitrile; vinyl ether monomers such as vinyl methyl ether and vinyl ethyl ether; vinyl carboxylate monomers such as vinyl acetate and vinyl butyrate, olefinic monomers such as ethylene, propylene and isobutylene; and diene monomers such as butadiene, isoprene, prene and dimethylbutadiene. These monomers may be used alone or in combinations of 2 or more.

The content of the polytetrafluoroethylene in the polytetrafluoroethylene-containing powder mixture of the invention is preferably 0.1 wt % to 90 wt %.

The polytetrafluoroethylene-containing powder mixture of the invention may be obtained by pouring the aqueous dispersion thereof into hot water which has dissolved a metal salt such as calcium chloride or magnesium sulfate, and then drying after salting out and aggregation, or spray drying, to produce powder.

Although most polytetrafluoroethylene fine powder cannot be easily dispersed in a uniform manner in thermoplastic resins because of production of aggregates of 100 $\mu$m or greater during the process of recovering the powder from the powder dispersion, the polytetrafluoroethylene-containing powder mixture of the present invention has very excellent dispersibility in thermoplastic resins because the polytetrafluoroethylene alone does not form domains exceeding a particle size of 10 μm.

As the thermoplastic resin (C) used according to the invention there may be mentioned polyolefin resins such as polyethylene, polypropylene and ethylene-propylene copolymer, polyester resins such as polyethylene terephthalate (PET), polyethylene naphthalate, polycyclohexane terephthalate, polybutylene terephthalate (PBT) and polybutylene naphthalate; polycarbonate (PC), butadiene rubber graft copolymer (for example, ABS resin), acrylic rubber graft copolymer, silicone-acrylic composite rubber graft copolymer, ethylene-propylene rubber graft copolymer, styrene-based resins such as high impact polystyrene (HIPS) and acrylonitrile-styrene copolymer (AS), vinyl chloride resin, polyacetal resin, polyphenylene sulfate resin, polyphenylene ether (PPE) resin, polyamide (PA) resins such as nylon 6 and nylon 66, and acrylic resins such as PMMA, as well as PET/PBT, PC/PBT, PBT/ABS, PC/ABS, PA/ABS, PPE/PBT, PPE/HIPS and PPE/PA. Polyolefin resins are particularly preferred, especially polypropylene resin.

As a more detailed explanation of the polyolefin resin to be used according to the invention, it includes polypropylene, polyethylene, poly-1-butene, polyisobutylene, random or block copolymers of propylene with ethylene and/or 1-butene in a desired proportion, ethylene-propylene-diene terpolymers with the ethylene and propylene in a desired proportion and no more than 50 wt % of the diene component, polymethylpentene, and random, block or graft copolymers of ethylene or propylene with no more than 50 wt % of a monomer other than an olefin with an ethylenically unsaturated group such as vinyl acetate, (meth)acrylic alkyl ester, aromatic vinyl compounds, etc.

As preferred polyolefins there may be mentioned propylene-based polyolefins containing at least 50 wt % of propylene and mixtures of 100 parts by weight of a propylene-based polyolefin containing at least 50 wt % of propylene and 0.1–100 parts by weight of an ethylene-based polyolefin containing at least 50 wt % of ethylene; preferred for their high melt tension and excellent workability are those with a melt flow rate of 10 g/10 minutes or lower according to ASTM D1238. The melt flow rate is measured according to ASTM D1238, at 230° C., 2.16 kg load for propylene-based polyolefins and at 190° C., 2.16 kg load for ethylene-based polyolefins.

According to the invention, mixture of the polytetrafluoroethylene-containing powder mixture with the thermoplastic resin results in increased tension of the melt during working of the thermoplastic resin composition, provides improved draw-off during calendering, drawdown of the melt during heat molding or blow molding and continuous foaming during foam molding, and improved workability for calendering, heat molding, blow molding and foam molding. In addition, for extrusion molding it improves the discharge rate and the surface condition of extrusion molds including sheets and films, and also improves the extrusion workability.

According to the invention, the amount of the polytetrafluoroethylene-containing powder mixture used is 0.001 to 50 parts by weight per 100 parts by weight of the thermoplastic resin (C). The amount of the polytetrafluoroethylene is preferably in the range of 0.001 to 40 parts by weight per 100 parts by weight of the thermoplastic resin.

A filler may also be added to the thermoplastic resin composition according to the invention. The amount of filler added is preferably 0.1 to 400 parts by weight per 100 parts by weight of the thermoplastic resin (C), and addition of the filler increases the rigidity and heat resistance while improving the workability, which includes preventing adhesion to roll surfaces during calendering, with costs reductions as well. If the amount is less than 0.1 part by weight the rigidity-improving effect is insufficient, and if it is greater than 400 parts by weight there is a tendency toward lower surface characteristics. The range is more preferably 1 to 350 parts by weight, and even more preferably 1 to 300 parts by weight.

As examples of fillers to be used according to the invention there may be mentioned calcium carbonate, talc, glass fibers, carbon fibers, magnesium carbonate, mica, kaolin, calcium sulfate, barium sulfate, titanium white, white carbon, carbon black, ammonium hydroxide, magnesium hydroxide and aluminum hydroxide. Calcium carbonate and talc are preferred.

If necessary, an additive such as a stabilizer, lubricant or flame retardant may also be added to the thermoplastic resin composition of the invention. As stabilizers there may be mentioned phenolic stabilizers such as pentaerythritol-tetrakis[3-(3,5-di-t-butyl-4-hydroxyphenyl) propionate] and triethyleneglycol-bis[3-(3-t-butyl-5-methyl-4-hydroxyphenyl) propionate], phosphoric stabilizers such as tris(monononylphenyl) phosphite and tris(2,4-di-t-butylphenyl) phosphite and sulfuric stabilizers such as dilaurylthiodipropionate; as lubricants there may be mentioned sodium, calcium or magnesium salts of lauric acid, palmitic acid, oleic acid or stearic acid; and as flame retardants there may be mentioned phosphoric acid ester compounds including trimethyl phosphate, triethyl phosphate, tributyl phosphate, trioctyl phosphate, tributoxyethyl phosphate, triphenyl phosphate, tricresyl phosphate, cresylphenyl phosphate, octyldiphenyl phosphate, diisopropylphenyl phosphate, tris(chloroethyl) phosphate, and polyphosphates, such as alkoxy-substituted bisphenol A bisphosphate, hydroquinone bisphosphate, resorcin bisphosphate, trioxybenzene triphosphate, halogen-containing compounds such as tetrabromobisphenol A, decabromodiphenyl oxide, hexabromocyclodecane, octabromodiphenyl ether, bistribromophenoxyethane, ethylene bistetrabromophthalimide, tribromophenol, halogenated epoxy oligomers obtained by reaction between halogenated bisphenol A and epichlorohydrin, carbonate oligomers with halogenated bisphenol A as a constituent, halogenated polystyrene, chlorinated polyolefins and polyvinyl chloride; and metal hydroxides, metal oxides, sulfamic acid compounds, etc.

The thermoplastic resin composition of the invention is obtained by mixing the aforementioned thermoplastic resin with the polytetrafluoroethylene-containing composite powder and if necessary a filler. The mixing method may be any conventionally known method, such as extrusion kneading or roll kneading. Also, a portion of the thermoplastic resin may be mixed with the polytetrafluoroethylene-containing powder mixture to prepare a master batch, and then the remaining thermoplastic resin may be added and mixed therewith later for multistage mixture. The thermoplastic resin composition of the invention has excellent dispersibility of the polytetrafluoroethylene, and therefore the workability, rigidity and surface appearance thereof is vastly improved, allowing production of molded articles by many different processes to provide useful molded products.

The process used for working the thermoplastic resin composition of the invention may be calender molding, extrusion molding, heat molding, blow molding, injection molding, foam molding or melt spinning.

As useful molded products to be obtained using the thermoplastic resin composition of the invention there may be mentioned sheets, films, thermoforms, blow molds, injection molds, foam molds and fibers.

The present invention will be further illustrated below by way of examples, with the understanding that the invention is not limited to these examples.

Throughout the descriptions, "parts" refers to parts by weight and "%" indicates percent by weight.

Synthesis of Polytetrafluoroethylene-containing Powder Mixture and Mixture with Polyolefin Resin Measurement of the physical properties described in Reference Examples 1–2, Examples 1–25 and Comparative Examples 1–15 was accomplished according to the following methods.

(1) Solid portion concentration: Determined by drying the particle dispersion at 170° C. for 30 minutes.

(2) Particle size distribution and weight average particle size: A sample solution of the particle dispersion diluted with water was measured by the dynamic light scattering method (ELS800 by Otsuka Electronics, temperature: 25° C., scattering angle: 90°).

(3) ζ potential: A sample solution of the particle dispersion diluted with a 0.01 mol/l aqueous NaCl solution was measured by electrophoresis (ELS800 by Otsuka Electronics, temperature: 25° C., scattering angle: 10°).

(4) Melt tension: Pellets of the resin composition were extruded at a constant extrusion rate (falling speed: 20 mm/min) using a falling flow tester (capillograph by Toyo Precision Instruments), and the strands were taken up at a constant rate (1 m/min) and subjected to melt tension measurement. The L/D of the die was 10.0 mm/Φ2.0 mm and the measuring temperature was 200° C.

(5) Swelling ratio: Pellets of the resin composition were extruded at a constant extrusion rate (falling speed: 1.5 mm/min) using a falling flow tester (capillograph by Toyo Precision Instruments), the strand diameter (D) was measured at a position 5 mm under the nozzle, and calculation was made with the following equation. The L/D of the die was 10.0 m/Φ2.0 mm and the measuring temperature was 190° C.

(Swelling ratio)=D(mm)/2.0

(6) Melt flow rate: Measured according to ASTM D1238 at 230° C., 2.16 kg using pellets of the resin composition.

(7) Flexural modulus: Measured according to ASTM D790 after obtaining test pieces by injection molding of the resin composition pellets.

(8) Roll sheet appearance: Judged based on visual appearance of roll sheets during roll kneading using pellets of the resin composition.

○—no surface irregularities and excellent luster

Δ—some surface irregularities and slightly impaired luster x—notable surface irregularities and poor luster (9) Drawdown: Pellets of the resin composition were used for molding of a sheet 100 mm square and 1.5 mm thick, and after anchoring with a clamp with a 75 mm square opening, the drawdown of the sheet in a 190° C. oven for 30 minutes was measured.

(10) Evaluation of foam molded products: 1.0 part of azodicarbonamide (foaming agent) was mixed with 100 parts by weight of the resin composition pellets and used for injection molding to form a foam molded product, after which the condition of cross-sectional cells thereof was judged visually.

○—fine and uniform

Δ—slightly nonuniform x—nonuniform

(11) Measurement of weight average molecular weight

The weight average molecular weight was determined by gel permeation chromatography using standard samples of polymethyl methacrylate.

REFERENCE EXAMPLE 1

Production of Polystyrene Particle Dispersion (P-1)

Into a separable flask equipped with a stirring blade, condenser, thermocouple and nitrogen inlet there were charged 190 parts of distilled water, 1.0 part of sodium dodecylbenzenesulfonate, 100 parts of styrene and 0.4 part of cumene hydroperoxide, and the temperature of the mixture was raised to 40° C. under a nitrogen gas flow. A mixture of 0.001 part iron (II) sulfate, 0.003 part disodium ethylenediaminetetraacetate, 0.24 part Rongalite salt and 10 parts of distilled water was then added and radical polymerization was initiated. After total heat release, the internal temperature of the system was kept at 40° C. for one hour to complete polymerization, to obtain a polymer particle dispersion (hereunder referred to as P-1). The weight average molecular weight of the polymer was 550,000.

The solid concentration of P-1 was 33.2%, the particle size distribution showed a single peak, the weight average particle size was 102 nm and the surface potential was −32 mV.

REFERENCE EXAMPLE 2

Production of Polydodecyl Methacrylate Particle Dispersion (P-2)

A 0.1 part portion of azobisdimethylvaleronitrile was dissolved in 100 parts of dodecyl methacrylate. To this was then added a mixture of 2.0 parts sodium dodecylbenzenesulfonate and 300 parts of distilled water, and after 2 minutes of stirring with a homomixer at 10,000 rpm, it was passed through a homogenizer twice at a pressure of 300 kg/cm$^2$ to obtain a stable dodecyl methacrylate preliminary dispersion. This was then charged into a separable flask equipped with a stirring blade, condenser, thermocouple and nitrogen inlet, and the mixture was raised to an internal temperature of 80° C. under a nitrogen gas flow and stirred for 3 hours for radical polymerization, to obtain a polymer particle dispersion (hereunder referred to as P-2). The weight average molecular weight of the polymer was 650,000.

The solid concentration of P-2 was 25.2%, the particle size distribution showed a single peak, the weight average particle size was 195 nm and the surface potential was −38 mV.

EXAMPLE 1

Production of Polytetrafluoroethylene-containing Powder Mixture (M-1)

Fluon AD936 by Asahi ICI Fluoropolymers was used as the polytetrafluoroethylene-based particle dispersion. The solid concentration of AD936 is 63.0%, and it contains 5% polyoxyethylene nonyl phenyl ether with respect to polytetrafluoroethylene. The particle size distribution of AD936 shows a single peak, the weight average particle size is 290 nm, and the surface potential is −20 mV.

To 83.3 parts of AD936 there was added 116.7 parts of distilled water to obtain polytetrafluoroethylene particle dispersion F-1 with a solid concentration of 26.2%. F-1 contains 25% polytetrafluoroethylene particles and 1.2% polyoxyethylene nonyl phenyl ether.

After charging 160 parts of F-1 (40 parts of polytetrafluoroethylene) and 180.7 parts of P-1 (60 parts of polystyrene) into a separable flask equipped with a stirring blade, condenser, thermocouple and nitrogen inlet, the mixture was stirred for one hour at room temperature under a nitrogen gas flow. The internal temperature was then raised to 80° C. and the temperature was maintained for one hour. No separation of solids was observed throughout the series of procedures, and a uniform particle dispersion was obtained. The solid concentration of the resulting particle dispersion was 29.4%, the particle size distribution was relatively broad, and the weight average particle size was 220 nm.

After loading 340.7 parts of this particle dispersion into 800 parts of hot water at 70° C. containing 10 parts of calcium chloride, the solids were separated, filtered and dried to obtain 98 parts of a polytetrafluoroethylene-containing powder mixture (M-1).

The dried M-1 was shaped into a thin strip with a press molding machine at 220° C. and then cut into super thin sections with a microtome, and these were observed with a transmission electron microscope while unstained. The polytetrafluoroethylene was observed as dark portions, but no aggregates or fibrils exceeding 10 gm were found.

EXAMPLE 2

Production of Polytetrafluoroethylene-containing Powder Mixture (M-2)

After charging 160 parts of F-1 used in Example 1 (40 parts of polytetrafluoroethylene) and 119.0 parts of P-2 (30 parts of polydodecyl methacrylate) into a separable flask equipped with a stirring blade, condenser, thermocouple and nitrogen inlet, 82.9 parts of distilled water was added and the mixture was stirred for one hour at room temperature under a nitrogen gas flow. The internal temperature was then raised to 80° C., and then after adding a mixed solution of 0.001 part iron (II) sulfate, 0.003 part disodium ethylenediamine tetraacetate, 0.24 part Rongalite salt and 10 parts of distilled water, a mixture of 30 parts methyl methacrylate and 0.6 part tert-butyl peroxide was added dropwise over one hour, and after the dropwise addition the internal temperature was kept at 80° C. for one hour to complete radical polymerization. No separation of solids was observed throughout the series of procedures, and a uniform particle dispersion was obtained. The solid concentration of the resulting particle dispersion was 24.9%, the particle size distribution was relatively broad, and the weight average particle size was 242 nm.

After loading 400 parts of this particle dispersion into 800 parts of hot water at 70° C. containing 10 parts of calcium chloride, the solids were separated, filtered and dried to obtain 99 parts of a polytetrafluoroethylene-containing powder mixture (M-2).

The dried M-2 was shaped into a thin strip with a press molding machine at 200° C. and then cut into super thin sections with a microtome, and these were observed with a transmission electron microscope while unstained. The polytetrafluoroethylene was observed as dark portions, but no aggregates or fibrils exceeding 10 μm were found.

EXAMPLE 3

Production of Polytetrafluoroethylene-containing Powder Mixture (M-3)

In the same manner as Example 2 there was obtained 99 parts of the polytetrafluoroethylene-containing powder mixture (M-3), except that 80 parts of F-1 (20 parts of polytetrafluoroethylene) was used and 198.4 parts of P-2 (50 parts of polydodecyl methacrylate) was used. No separation of solids was found in the particle dispersion prior to hardening, the solid concentration was 24.8%, the particle size distribution was relatively broad, and the weight average particle size was 220 nm.

The dried M-3 was shaped into thin strip with a press molding machine at 200° C. and then cut into super thin sections with a microtome, and these were observed with a transmission electron microscope while unstained. The polytetrafluoroethylene was observed as dark portions, but no aggregates or fibrils exceeding 10 μm were found.

EXAMPLE 4

Production of Polytetrafluoroethylene-containing Powder Mixture (M-4)

There was obtained 97 parts of the polytetrafluoroethylene-containing powder mixture (M-4) in the same manner as Example 2, except that 240 parts of F-1 (60 parts of polytetrafluoroethylene) was used and 39.7 parts of P-2 (10 parts of polydodecyl methacrylate) was used. No separation of solids was found in the particle dispersion prior to hardening, the solid concentration was 24.8%, the particle size distribution was relatively broad, and the weight average particle size was 269 nm.

The dried M-4 was shaped into a thin strip with a press molding machine at 200° C. and then cut into super thin sections with a microtome, and these were observed with a transmission electron microscope while unstained. The polytetrafluoroethylene was observed as dark portions, but no aggregates or fibrils exceeding 10 μm were found.

EXAMPLES 5–20

Homopolypropylene pellets (melt flow rate: 5.0 g/10 min) used as the polyolefin were hand blended with the polytetrafluoroethylene-containing powder mixtures M-1, M-2, M-3 and M-4 in the proportions shown in Table 1, and then a twin-screw extruder (ZSK30, product of WERNER & PFLEIDERER Co.) was used for melt kneading at a barrel temperature of 200° C. and a screw rotation rate of 200 rpm for shaping into pellets. Measurement of the physical properties of the resulting pellets gave the results shown in Tables 1 and 2.

Comparative Examples 1–5

For comparison, evaluation was made in the same manner as Example 5 using pellets (Comparative Example 1) obtained by extrusion of a polyolefin under the same conditions as Example 5, and pellets (Comparative Examples 2–5) obtained by extrusion under the same conditions as Example 5 after adding powdered polytetrafluoroethylene to the powdered polyolefin, stirring and mixing at room temperature and high speed with a Henschel mixer while applying shear force to prepare polytetrafluoroethylene fibers. The results are shown in Tables 1 and 2.

Homopolypropylene pellets (Comparative Example 1) or powdered polypropylene (Comparative Examples 2–5) were used as the polyolefin (all with a melt flow rate of 5.0 g/10 min), and Fluon CD123 by Asahi ICI Fluoropolymers was used as the powdered polytetrafluoroethylene. CD123 exists as aggregates of a few 100 μm resulting from aggregation of polytetrafluoroethylene primary particles of particle size 0.2–0.3 μm.

TABLE 1

| Example No. | Composition PP (parts) | Additive (parts) | Type of additive | PTFE in composition (%) | MT (g) | SR | MFR (g/10 min) |
|---|---|---|---|---|---|---|---|
| Example | | | | | | | |
| 5 | 100 | 10 | M-1 | 3.6 | 58 | 2.4 | 0.9 |
| 6 | 100 | 5 | M-1 | 1.9 | 32 | 2.3 | 2.3 |
| 7 | 100 | 1 | M-1 | 0.4 | 10 | 2.0 | 3.3 |
| 8 | 100 | 0.5 | M-1 | 0.2 | 7 | 1.8 | 4.2 |
| 9 | 100 | 10 | M-2 | 3.6 | 61 | 2.4 | 0.9 |
| 10 | 100 | 5 | M-2 | 1.9 | 38 | 2.4 | 2.4 |
| 11 | 100 | 1 | M-2 | 0.4 | 19 | 2.1 | 3.2 |
| 12 | 100 | 0.5 | M-2 | 0.2 | 9 | 1.8 | 4.1 |
| 13 | 100 | 10 | M-3 | 1.8 | 54 | 2.4 | 0.9 |
| 14 | 100 | 5 | M-3 | 1.0 | 32 | 2.3 | 2.4 |
| 15 | 100 | 1 | M-3 | 0.2 | 11 | 2.1 | 3.4 |
| 16 | 100 | 0.5 | M-3 | 0.1 | 7 | 1.9 | 4.2 |
| 17 | 100 | 10 | M-4 | 5.5 | 64 | 2.4 | 0.8 |
| 18 | 100 | 5 | M-4 | 2.9 | 37 | 2.3 | 2.3 |
| 19 | 100 | 1 | M-4 | 0.6 | 12 | 2.0 | 3.3 |
| 20 | 100 | 0.5 | M-4 | 0.3 | 8 | 1.9 | 4.1 |
| Comp. Example | | | | | | | |
| 1 | 100 | 0 | | 0 | 3 | 1.3 | 5.0 |
| 2 | 100 | 3.7 | CD123 | 3.6 | 5 | 1.5 | 0.8 |
| 3 | 100 | 1.9 | CD123 | 1.9 | 5 | 1.5 | 2.1 |
| 4 | 100 | 0.4 | CD123 | 0.4 | 4 | 1.4 | 3.0 |
| 5 | 100 | 0.2 | CD123 | 0.2 | 3 | 1.3 | 4.1 |

TABLE 2

| Example | Flexural modulus (kg/cm²) | Roll sheet appearance | Drawdown (mm) | Foam mold evaluation |
|---|---|---|---|---|
| 5 | 13100 | Δ | 0 | ○ |
| 6 | 13700 | Δ | 0 | ○ |
| 7 | 14000 | Δ | 0 | ○ |
| 8 | 14000 | Δ | 2 | Δ |
| 9 | 13000 | ○ | 0 | ○ |
| 10 | 13500 | ○ | 0 | ○ |
| 11 | 14000 | ○ | 0 | ○ |
| 12 | 14000 | ○ | 2 | Δ |
| 13 | 13000 | ○ | 0 | ○ |
| 14 | 13500 | ○ | 0 | ○ |
| 15 | 14000 | ○ | 0 | ○ |
| 16 | 14000 | ○ | 2 | Δ |
| 17 | 13200 | Δ | 0 | ○ |
| 18 | 13800 | Δ | 0 | ○ |
| 19 | 14000 | ○ | 0 | ○ |
| 20 | 14000 | ○ | 2 | ○ |
| Comp. Example | | | | |
| 1 | 14000 | ○ | 90 | x |
| 2 | 14000 | x | 20 | x |
| 3 | 14000 | x | 20 | x |
| 4 | 14000 | x | 40 | x |
| 5 | 14000 | x | 80 | x |

PP: polypropylene (melt flow rate: 5.0 g/10 min)
MT: melt tension
SR: swelling ratio
MFR: melt flow rate
CD123: powdered polytetrafluoroethylene (Fluon CD123 by Asahi ICI Fluoropolymers)

The compositions of the invention which included polytetrafluoroethylene-containing composite particles had significantly higher values for the melt tension and swelling ratio which were indicators of the draw-off properties for calender working, the heat moldability, blow moldability and foam moldability, compared to the comparative examples with the same PTFE contents, thus confirming their satisfactory molding workability. On the other hand, they also had low reduction in the melt flow rate, confirming that the extrusion moldability was not impaired. In addition, the roll sheet appearance, draw-down and foam moldability were also confirmed to be very excellent.

EXAMPLES 21–23

Homopolypropylene pellets (melt flow rate: 5.0 g/10 min) and low density polyethylene pellets (melt flow rate: 0.3 g/10 min) were mixed and used as the polyolefin and were hand blended with the polytetrafluoroethylene-containing powder mixture M-2 in the proportions shown in Table 3, for shaping into pellets in the same manner as Example 5. Measurement of the physical properties of the pellets gave the results shown in Tables 3 and 4.

Comparative Examples 6–11

Extruded mixtures of homopolypropylene pellets and low density polyethylene pellets (Comparative Examples 6–8), and extruded mixtures of powdered homopropylene, powdered low density polyethylene and powdered polytetrafluoroethylene which had been mixed with a Henschel mixer (Comparative Examples 9–11) were evaluated in the same manner as Example 5. The results are shown in Tables 3 and 4.

TABLE 3

| Example No. | Composition PP (pts) | PE (pts) | Additive (parts) | Type of additive | PTFE in composition (%) | MT (g) | SR |
|---|---|---|---|---|---|---|---|
| Example | | | | | | | |
| 21 | 100 | 20 | 2 | M-2 | 0.66 | 19 | 2.0 |
| 22 | 100 | 50 | 2.5 | M-2 | 0.66 | 25 | 2.2 |
| 23 | 100 | 100 | 3.3 | M-2 | 0.65 | 38 | 2.3 |
| Comp. Example | | | | | | | |
| 6 | 100 | 20 | 0 | — | 0 | 3 | 1.3 |
| 7 | 100 | 50 | 0 | — | 0 | 4 | 1.4 |
| 8 | 100 | 100 | 0 | — | 0 | 6 | 1.5 |
| 9 | 100 | 20 | 0.8 | CD123 | 0.66 | 4 | 1.4 |
| 10 | 100 | 50 | 1.0 | CD123 | 0.66 | 5 | 1.6 |
| 11 | 100 | 100 | 1.3 | CD123 | 0.65 | 8 | 1.6 |

TABLE 4

| | MFR (g/10 min) | Flexural modulus (kg/cm²) | Roll sheet appearance | Drawdown (mm) | Foam mold evaluation |
|---|---|---|---|---|---|
| Example | | | | | |
| 21 | 3.2 | 12000 | ○ | 0 | ○ |
| 22 | 3.3 | 9000 | ○ | 0 | ○ |
| 23 | 3.4 | 7000 | ○ | 0 | ○ |
| Comp. Example | | | | | |
| 6 | 5.0 | 12000 | ○ | 40 | x |
| 7 | 5.0 | 9000 | ○ | 30 | x |
| 8 | 5.0 | 7000 | ○ | 30 | x |

TABLE 4-continued

|  | MFR (g/10 min) | Flexural modulus (kg/cm$^2$) | Roll sheet appearance | Drawdown (mm) | Foam mold evaluation |
|---|---|---|---|---|---|
| 9 | 3.0 | 12000 | x | 20 | x |
| 10 | 3.2 | 9000 | x | 20 | x |
| 11 | 3.3 | 7000 | x | 10 | x |

PP: polypropylene (melt flow rate: 5.0 g/10 min)
PE: low density polyethylene (melt flow rate: 0.3 g/10 min)
MT: melt tension
SR: swelling ratio
MFR: melt flow rate
CD123: powdered polytetrafluoroethylene (Fluon CD123 by Asahi ICI Fluoropolymers)

EXAMPLES 24–25

Homopolypropylene pellets (melt flow rate: 5.0 g/10 min), low density polyethylene pellets (melt flow rate: 0.3 g/10 min), polytetrafluoroethylene-containing composite particle dry powder M-2 and light calcium carbonate of particle size 0.15 μm which had been surface-treated with fatty acid were hand blended in the proportions shown in Table 5, and then shaped into pellets in the same manner as Example 5. Measurement of the physical properties of the pellets gave the results shown in Tables 5 and 6.

Comparative Examples 12–15

Pellets were shaped in the same manner as Example 5 from mixtures of powdered homopolypropylene (melt flow rate: 5.0 g/10 min), powdered low density polyethylene (melt flow rate: 0.3 g/10 min) and light calcium carbonate (Comparative Examples 12–13) and from extruded mixtures with which powdered polytetrafluoroethylene was further combined and mixed with a Henschel mixer (Comparative Examples 14–15). The results of evaluating the physical properties are shown in Tables 5 and 6.

TABLE 5

|  | Composition | | | | | PTFE | |
|---|---|---|---|---|---|---|---|
|  | PP (pts) | PE (pts) | CC (pts) | Additive (pts) | Type of additive | in composition (%) | MT (g) |
| Example |  |  |  |  |  |  |  |
| 24 | 100 | — | 50 | 2 | M-2 | 0.53 | 24 |
| 25 | 100 | 50 | 50 | 2.5 | M-2 | 0.49 | 25 |
| Comp. Example |  |  |  |  |  |  |  |
| 12 | 100 | — | 50 | 0 | — | 0 | 4 |
| 13 | 100 | 50 | 50 | 0 | — | 0 | 4 |
| 14 | 100 | — | 50 | 0.8 | CD123 | 0.53 | 5 |
| 15 | 100 | 50 | 50 | 1.0 | CD123 | 0.50 | 5 |

TABLE 6

|  | SR | MFR (g/10 min) | Flexural modulus (kg/cm$^2$) | Roll sheet appearance | Drawdown (mm) |
|---|---|---|---|---|---|
| Example |  |  |  |  |  |
| 24 | 2.1 | 3.2 | 16000 | ○ | 0 |
| 25 | 2.2 | 3.3 | 11000 | ○ | 0 |
| Comp. Example |  |  |  |  |  |
| 12 | 1.3 | 5.0 | 16000 | ○ | 90 |
| 13 | 1.4 | 5.0 | 11000 | ○ | 30 |
| 14 | 1.5 | 3.0 | 16000 | x | 30 |
| 15 | 1.6 | 3.2 | 11000 | x | 20 |

PP: polypropylene (melt flow rate: 5.0 g/10 min)
PE: low density polyethylene (melt flow rate: 0.3 g/10 min)
CC: light calcium carbonate of particle size 0.15 μm surface treated with fatty acid
MT: melt tension
SR: swelling ratio
MFR: melt flow rate
CD123: powdered polytetrafluoroethylene (Fluon CD123 by Asahi ICI Fluoropolymers)
Combination with Polyester Resin Measurement of the physical properties described in Example 26 and Comparative Examples 16–17 was accomplished according to the following methods.

(12) Intrinsic viscosity of polyester: Measured at 25° C. in o-chlorophenol

(13) Melt tension: Pellets of the resin composition were extruded at a constant extrusion rate (falling speed: 20 mm/min) using a falling flow tester (capillograph by Toyo Precision Instruments), and the strands were taken up at a constant rate (1 m/min) and subjected to melt tension measurement. The LID of the die was 10.0 mm/(Φ2.0 mm and the measuring temperature was 270° C.

(14) Blow moldability: Pellets of the resin composition were used to mold a cylindrical container with an average thickness of 2.5 mm and an internal volume of 500 cc, using a blow molding machine (S-45ND by Plakow) with a cylinder temperature of 270° C., a die (die diameter: 50 mm, die spacing: 3 mm) temperature of 270° C., a molding frame temperature of 80° C. and a blowing pressure of 5 kg/cm.

(15) Drawdown: The drawdown index was evaluated as the ratio of the time until the length of the parison extruded from the blow molding machine reached 120 mm to the time until it reaches 600 mm. Resins with absolutely no drawdown were assigned a drawdown value of 5, and those with instantaneous drawdown were assigned a value of 1.

(16) Uniformity of molded product thickness: The molded product was cut, and the thickness was measured at 3 locations, the top, center and bottom of the cylinder using a micrometer, to determine the fluctuation in thickness (% of difference between maximum value and minimum value with respect to average thickness).

(17) Appearance: The surface smoothness was evaluated visually as either good or poor.

EXAMPLE 26

Powdered polyethylene terephthalate resin with an intrinsic viscosity of 1.00 used as the polyester resin was hand blended with the polytetrafluoroethylene-containing powder mixture M-1 in the proportion shown in Table 7, and then a twin-screw extruder (ZSK30, product of WERNER & PFLEIDERER Co.) was used for melt kneading at a barrel temperature of 280° C. and a screw rotation rate of 200 rpm for shaping into pellets. Measurement of the physical properties of the resulting pellets gave the results shown in Table 7.

Comparative Examples 16–17

For comparison, evaluation was made in the same manner as Example 26 using pellets (Comparative Example 16) obtained by extrusion of a polyester resin alone under the same conditions as Example 26, and pellets (Comparative Example 17) obtained by extrusion under the same conditions as Example 26 after adding powdered polytetrafluoroethylene to the powdered polyethylene terephthalate, stirring and mixing at room temperature and high speed with a Henschel mixer while applying shear force to prepare polytetrafluoroethylene fibers. The results are shown in Table 7.

The powdered polytetrafluoroethylene used was Fluon CD123 by Asahi ICI Fluoropolymers.

TABLE 7

|  | Composition | | PTFE in | | | Uniform | |
|---|---|---|---|---|---|---|---|
|  | PET (pts) | Additive (pts) | Type of additive | composition (%) | MT (g) | Drawdown index | thickness (%) | Appearance |
| Ex. 26 | 100 | 1 | M-1 | 0.4 | 4.2 | 2.82 | 17 | good |
| Comp. Ex. 16 | 100 | 0 | — | 0 | 0.3 | 1.22 | unmoldable | unmoldable |
| 17 | 100 | 0.4 | CD123 | 0.4 | 0.6 | 1.30 | unmoldable | unmoldable |

PET: polyethylene terephthalate (intrinsic viscosity: 1.00)
MT: melt tension
CD123: powdered polytetrafluoroethylene (Fluon CD123 by Asahi ICI Fluoropolymers)

The compositions of the invention which included polytetrafluoroethylene-containing composite particles had significantly higher values for the melt tension as an indicator of the draw-off properties for calender working, the heat moldability, blow moldability and foam moldability, compared to the comparative examples with the same PTFE contents, thus confirming their satisfactory molding workability. In addition, the draw-down resistance during blow molding was also very excellent, and blow molded products with excellent appearance were obtained.

The polytetrafluoroethylene-containing composite powder of the present invention has very satisfactory dispersibility in thermoplastic resins, and thermoplastic resin compositions incorporating it have high tension when melted, as well as excellent molding workability including draw-off properties for calender working, heat moldability, blow moldability and foam moldability. Furthermore, use of the composition of the invention results in improved surface conditions of extrusion molded products such as sheets and films, and satisfactory extrusion workability. In addition, addition of a filler provides improved surface conditions for sheets and films during calender and extrusion working as well as excellent rigidity.

We claim:

1. A polytetrafluoroethylene-containing powder mixture comprising polytetrafluoroethylene particles (1) with a particle size 10 μm or smaller and organic polymer particles (B) wherein the organic powder is a polymer obtained from one or more monomers containing at least 20 wt % of a long-chain alkyl (meth)acrylic acid ester monomer with 12 or more carbon atoms.

2. A process for producing a polytetrafluoroethylene-containing powder mixture according to claim 1, whereby a 0.05–1.0 μm particle-size polytetrafluoroethylene particle aqueous dispersion and an organic polymer particle aqueous dispersion are mixed and then subjected to solidifying or spray drying to make a powder.

3. A process for producing a polytetrafluoroethylene-containing powder mixture according to claim 1, wherein a monomer with an ethylenically unsaturated bond is subjected to emulsion polymerization in a dispersion prepared by mixing a 0.05–1.0 μm particle-size polytetrafluoroethylene particle aqueous dispersion and an organic polymer particle aqueous dispersion, and then solidifying or spray drying is accomplished to make a powder.

4. A thermoplastic resin composition comprising a mixture of a polytetrafluoroethylene-containing powder mixture according to claim 1 with a thermoplastic resin (C).

5. A thermoplastic resin composition according to claim 4, wherein the thermoplastic resin (C) is a polyolefin resin.

6. A thermoplastic resin composition according to claim 4 or 5, which further contains a filler.

7. A foam product which comprises a thermplastic resin composition according to claim 4.

8. A heat-molded sheet which comprises a thermoplastic resin composition according to claim 4.

9. Fibers which comprise a thermoplastic resin composition according to claim 4.

10. A polytetrafluoroethylene-containing resin composition for thermoplastic resins, which comprises the polytetrafluoroethylene-containing powder mixture according to claim 1 and a thermoplastic resin.

11. The polytetrafluoroethylene-containing powder mixture as claimed in claim 1, wherein the powder mixture is prepared by mixing an aqueous dispersion of a 0.05–1.0 micrometer particle-size polytetrafluoroethylene particles and an aqueous dispersion of organic polymer particles, followed by solidification or spray drying to provide the powder mixture.

12. A thermoplastic resin composition comprising a mixture of the polytetrafluoroethylene-containing powder mixture according to claim 11, with a thermoplastic resin (C).

13. A thermoplastic resin composition according to claim 12, wherein the thermoplastic resin (C) is a polyolefin resin.

14. A thermoplastic resin composition according to claim 13, wherein the polyolefin resin is polypropylene.

* * * * *